United States Patent
Wei et al.

(10) Patent No.: US 11,947,538 B2
(45) Date of Patent: Apr. 2, 2024

(54) QUERY PROCESSING

(71) Applicant: INTERNATIONAL BUSINESS MACHINES CORPORATION, Armonk, NY (US)

(72) Inventors: Ke Wei Wei, Beijing (CN); Shuang Yu, Beijing (CN); Zhenyu Shi, Beijing (CN); Ji Gao Fu, Beijing (CN); Heng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/736,302

(22) Filed: May 4, 2022

(65) Prior Publication Data

US 2023/0359621 A1 Nov. 9, 2023

(51) Int. Cl.
*G06F 16/00* (2019.01)
*G06F 16/2453* (2019.01)
*G06F 16/2458* (2019.01)
*G06F 16/248* (2019.01)

(52) U.S. Cl.
CPC .... *G06F 16/24542* (2019.01); *G06F 16/2477* (2019.01); *G06F 16/248* (2019.01)

(58) Field of Classification Search
CPC ........... G06F 16/24542; G06F 16/2477; G06F 16/248
USPC .................................................. 707/600–899
See application file for complete search history.

(56) References Cited

U.S. PATENT DOCUMENTS

| | | | |
|---|---|---|---|
| 7,310,638 B1* | 12/2007 | Blair | G06F 16/24568 |
| 10,956,422 B2* | 3/2021 | de Castro Alves | G06F 16/24568 |
| 2014/0156636 A1* | 6/2014 | Bellamkonda | G06F 16/24556 707/718 |
| 2017/0083573 A1* | 3/2017 | Rogers | G06F 16/2455 |
| 2021/0081250 A1* | 3/2021 | Chauhan | G06F 9/5055 |
| 2021/0124739 A1 | 4/2021 | Karanasos | |
| 2021/0174238 A1* | 6/2021 | Song | G06F 16/24542 |
| 2021/0224275 A1* | 7/2021 | Maheshwari | G06N 3/044 |

OTHER PUBLICATIONS

Chen, Tracy, "Batch Inference in Azure Machine Learning", Microsoft, Published May 26, 2020, 6 pages, <https://techcommunity.microsoft.com/t5/ai-machine-learning-blog/batch-inference-in-azure-machine-learning/ba-p/1417010>.
Levy, Eran, "Batch, Stream, and Micro-batch Processing: A Cheat Sheet", Upsolver, Jan. 21, 2021, 10 pages, <https://www.upsolver.com/blog/batch-stream-a-cheat-sheet>.
Mell et al., "The NIST Definition of Cloud Computing", Recommendations of the National Institute of Standards and Technology, Special Publication 800-145, Sep. 2011, 7 pages.
(Continued)

*Primary Examiner* — Michelle N Owyang
(74) *Attorney, Agent, or Firm* — Monchai Chuaychoo

(57) ABSTRACT

A method for processing a plurality of queries is provided according to embodiments of the present disclosure. In this method, based on a plurality of queries and an execution plan for the plurality of quires, a plurality of record identification (ID) numbers can be stored into a pool in a numerical order. Each of the plurality of record ID numbers can identify a data record in a database. Then, the execution plan can be performed to batch a plurality of data records corresponding to the plurality of record ID numbers in the database based on a distribution of the plurality of record ID numbers in the pool.

20 Claims, 10 Drawing Sheets

(56) References Cited

OTHER PUBLICATIONS

Shoolman, Yiftach, "The Challenges in Building an AI Inference Engine for Real-Time Applications", Redis, Apr. 17, 2020, 9 pages, <https://redis.com/blog/the-challenges-in-building-an-ai-inference-engine-for-real-time-applications/>.

Wojnicki, Igor, "Tight coupling", Nov. 7, 2005, 2 pages, <https://home.agh.edu.pl/~wojnicki/phd/node54.html>.

* cited by examiner

QUERY PROCESSING

BACKGROUND

The present invention relates to data processing and, more specifically, to query processing.

A database system is one of the most common applications of computer systems. Database systems are used in almost all areas of everyday life. Database systems are utilized in areas of business, engineering, medicine, law, and education.

Relational databases store data by organizing the data into predefined data categories in a form of related tables. The data within the relational databases may be accessed through a query by using high-level query languages, such as Structured Query Language (SQL). The query, which may be represented by a SQL statement, denominates a set of commands for retrieving data from relational databases.

SUMMARY

Various embodiments are directed to a method for processing a plurality of queries. In this method, based on a plurality of quires and an execution plan for the plurality of quires, a plurality of record identification (ID) numbers can be stored in a pool in a numerical order. Each of the plurality of record ID numbers can identify a data record in a database. Then, the execution plan can be performed to batch a plurality of data records corresponding to the plurality of record ID numbers in the database based on a distribution of the plurality of record ID numbers in the pool.

Further embodiments are directed to a system, which includes a memory and one or more processors communicatively coupled to the memory, wherein the one or more processors is configured to perform the method. The system may comprise one or more processors, a memory coupled to at least one of the one or more processors, and a set of computer program instructions stored in the memory. The set of computer program instructions may be executed by at least one of one or more processors to perform the above method.

Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
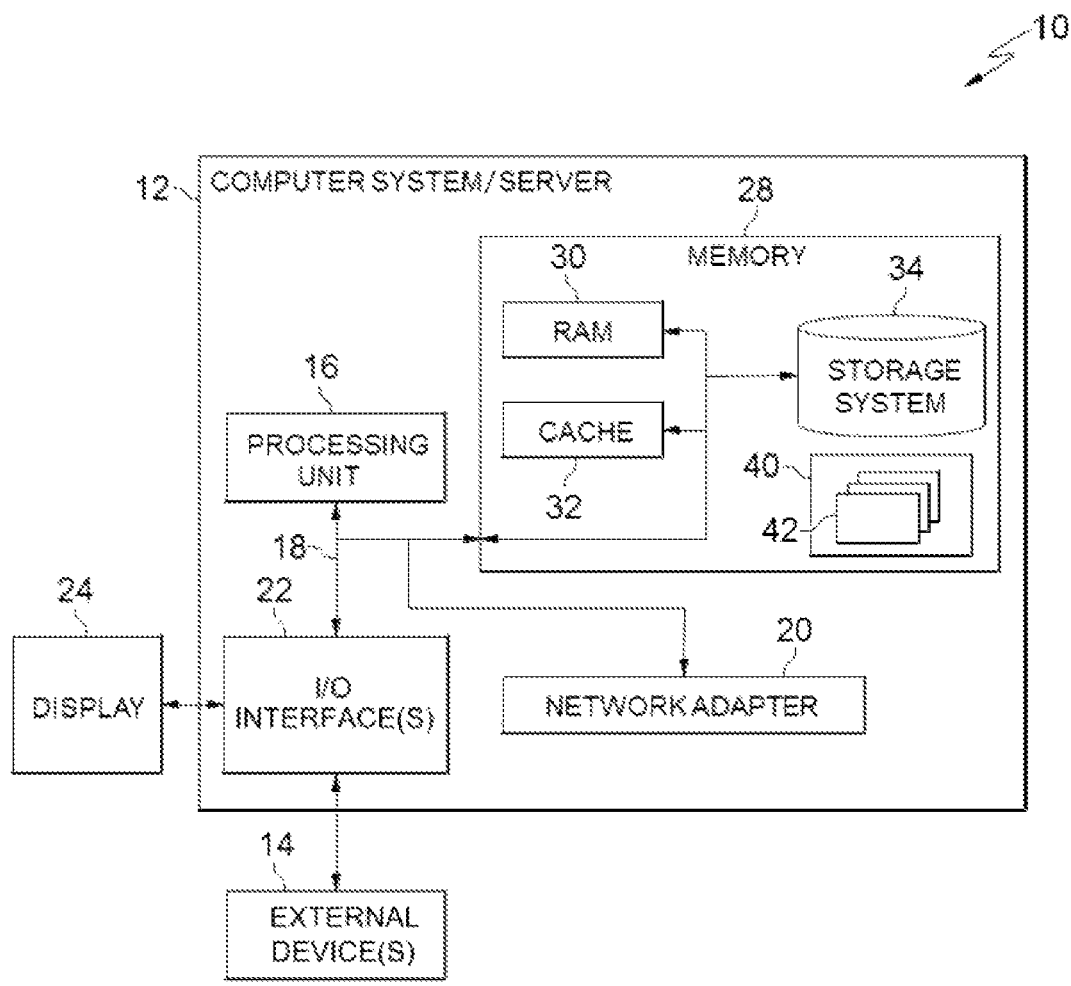
FIG. 1 depicts a cloud computing node according to some embodiment of the present disclosure.

Aspects of the present disclosure relate generally to a method for processing a plurality of queries. While the present disclosure is not necessarily limited to such applications, various aspects of the disclosure may be appreciated through a discussion of various examples using the context.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
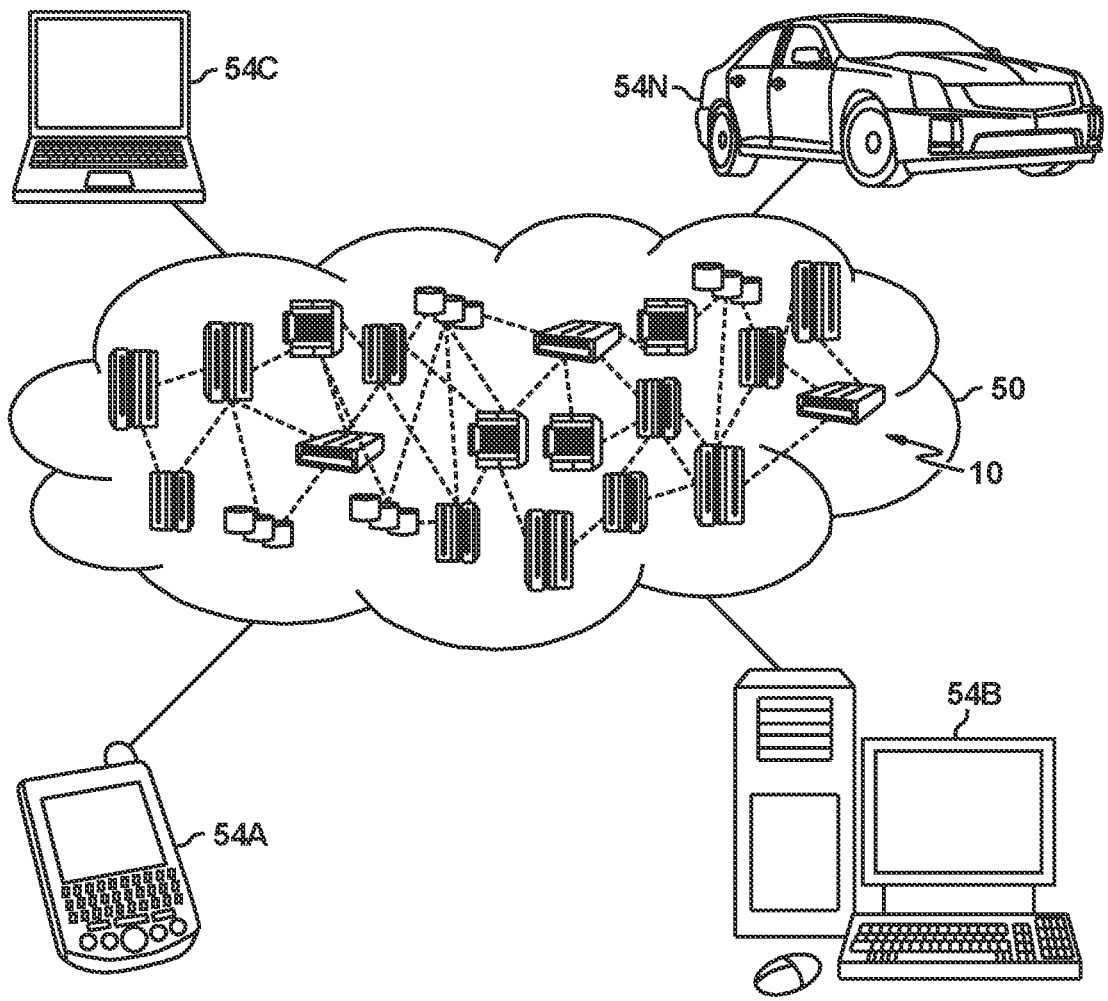
FIG. 2 is a block diagram illustrating a cloud computing environment, according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
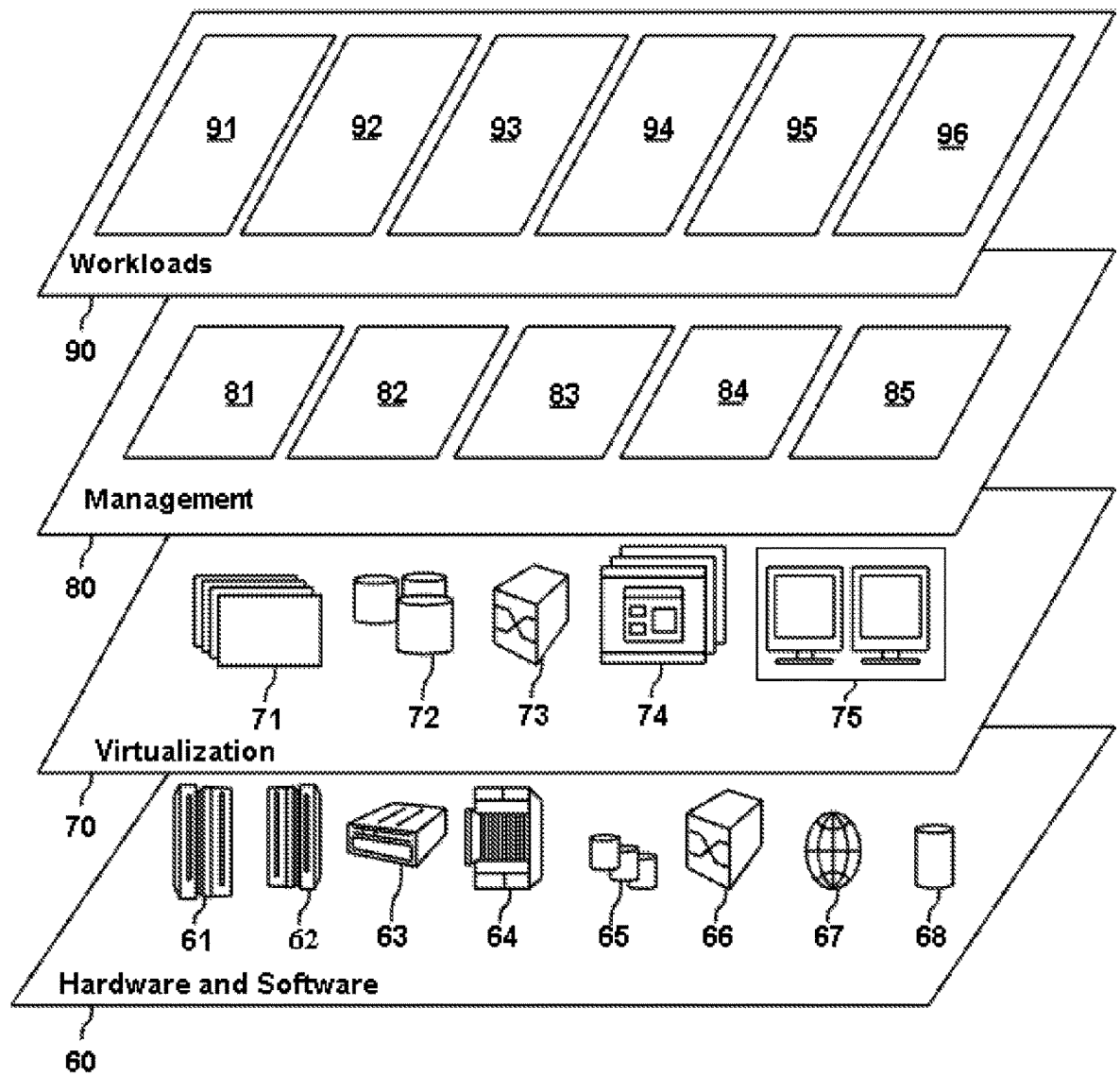
FIG. 3 is a block diagram illustrating a set of functional abstraction model layers provided by the cloud computing environment, according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query processing 96.

Generally, an application may send a plurality of queries to access data records (also can be referred to as features) from a database. In a case that the database is an on-disk database, an efficiency of disk Input/Output (I/O) operations may have a significant impact on costs of query processing.

Figure 4:
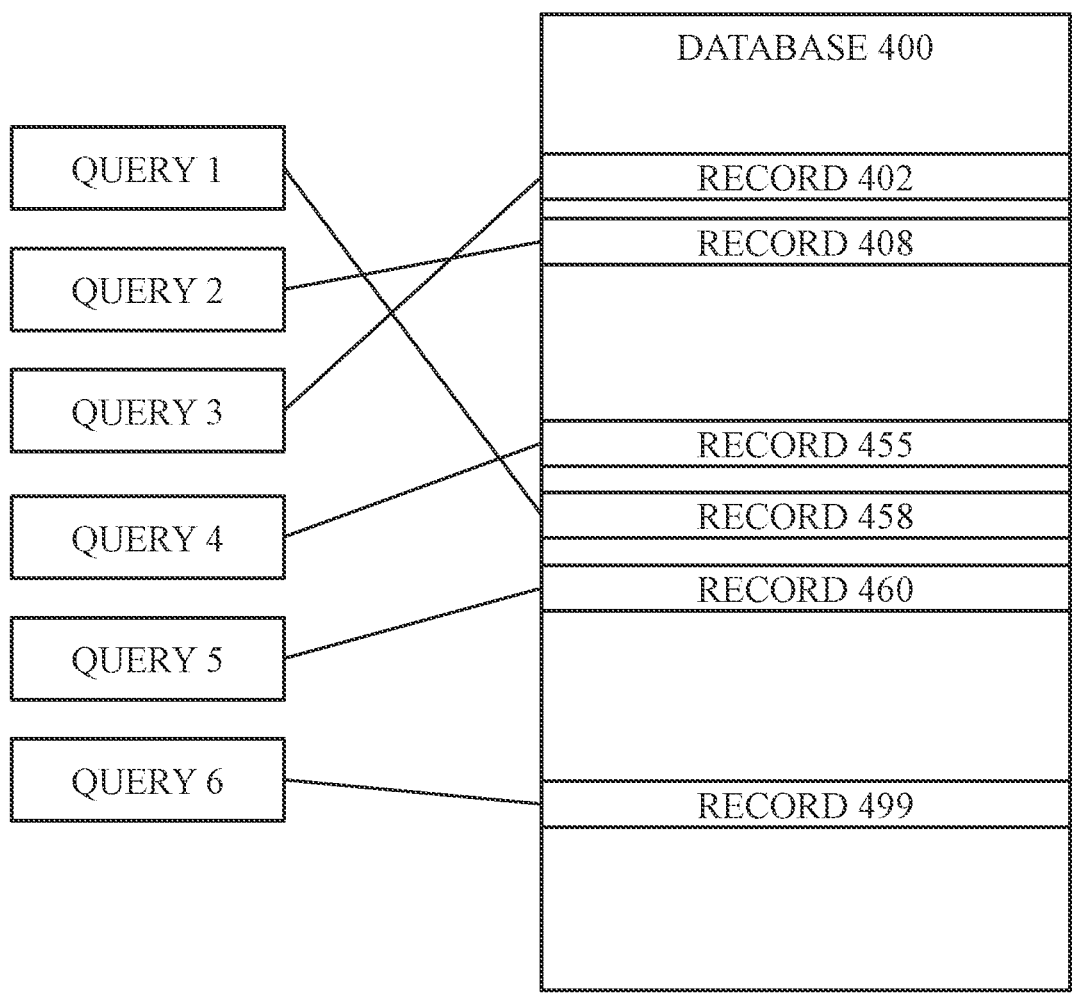
FIG. 4 depicts an exemplary process of querying relative to a database 400 according to some embodiments of the present disclosure.

FIG. 4 shows an exemplary process of querying relative to a database 400 according to embodiments of the present disclosure. As shown in FIG. 4, an application may send a plurality of queries, such as, QUERY 1, QUERY 2, QUERY 3, QUERY 4, QUERY 5, and QUERY 6 sequentially, to access the corresponding data records from the database 400. In some embodiments, the respective queries may have the same query statement with same or different variables, for example, customer identification (ID). For instance, SELECT*FROM CUSTOMER WHERE CUSTOMER_ID=1 and SELECT*FROM CUSTOMER WHERE CUSTOMER_ID=2 are the same query statements with different identifier as variables. Moreover, the variables may also be user ID, project ID, or the like. It can be understood that different kinds of identifiers belong to different query statements, for example, the query SELECT*FROM CUSTOMER and the query SELECT*FROM PROJECT have different query statements.

A database system (not shown in FIG. 4), configured to manage the database 400, may determine an execution plan for the respective queries. For the queries with the same query statement (no matter the variables are the same or different), they may share the same execution plan. First, the database system may determine an execution plan for one of the queries, and reuse the execution plan for other queries with the same query statements. Then, the database system may perform the execution plan for each of the queries, to access an index in or related to the database 400, to retrieve the respective record identification (ID) numbers (such as RECORD 402, RECORD 408, RECORD 455, RECORD 458, RECORD 460, RECORD 499, or the like). Each record ID number may identify a storage location of the data record on the disk. For brevity and not obscuring subject of this application, only some of the data records in the database 400 are shown in FIG. 4. The database system may perform the execution plan for each query to access the corresponding data records from the database 400.

For example, the application may firstly send the query QUERY 1 to the database system. First, the database system may determine the execution plan for the query QUERY 1, which may access a table that is stored in a storage device, such as a memory, a cache, or the like. Next, the database system may perform the execution plan for the query QUERY 1 to retrieve the record ID number RECORD 458 from the index, and access to the data record corresponding to the record ID number RECORD 458 from the database 400. Then, the application may send the query QUERY 2. The database system may determine that the query QUERY 2 has the same query statement as the query QUERY 1, and may use the same execution plan for the query QUERY 2. Then, the database system may perform the execution plan for the query QUERY 2 to retrieve the record ID number RECORD 408, and access to the data record corresponding to the record ID number RECORD 408 from the database 400. Similarly, the application may send the query QUERY 3 to access the record RECORD 402, send the query QUERY 4 to access the record RECORD 455, send the query QUERY 5 to access the record RECORD 460, and send the query QUERY 6 to access the record RECORD 499. As seen from FIG. 4, a plurality of disk I/O operations are executed during the query process. In a case of processing a huge number of queries, there is a need to improve the efficiency of the disk I/O operations to reduce costs of query processing.

Figure 5:
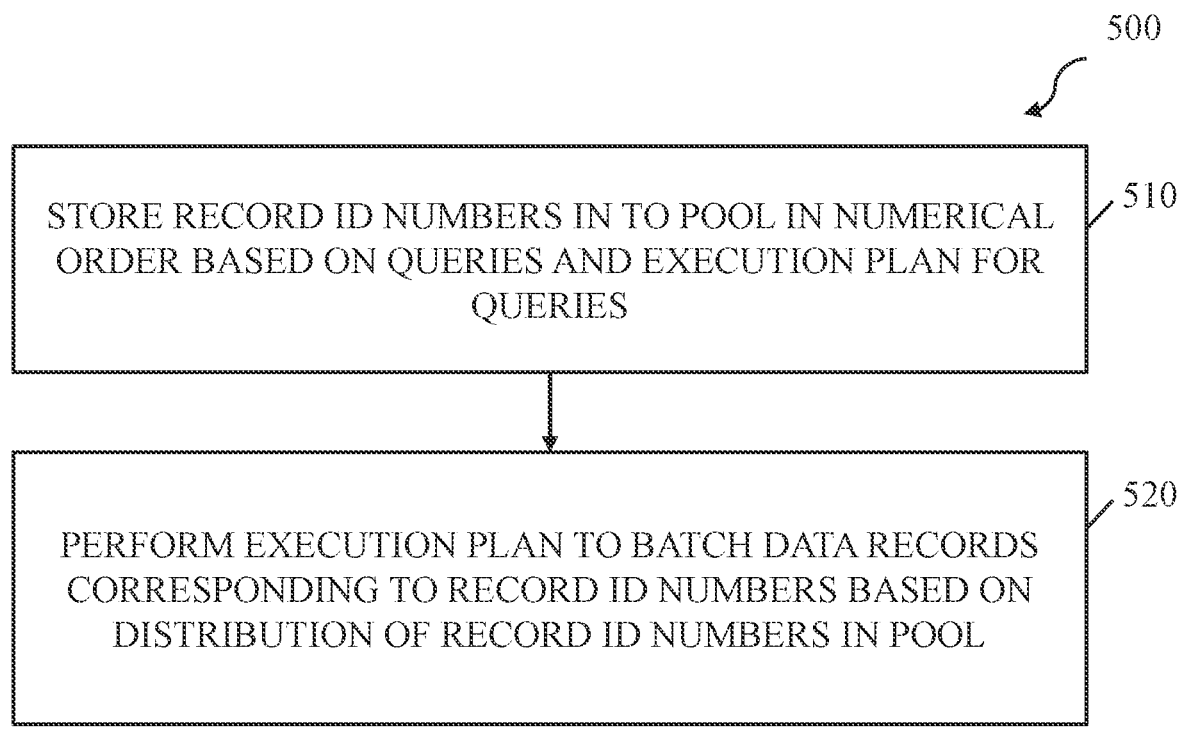
FIG. 5 depicts a schematic flowchart of a method for processing a plurality of queries according to some embodiments of the present disclosure.

Embodiments of the present disclosure provide a method for processing a plurality of queries. FIG. 5 shows a schematic flowchart of a method 500 for processing a plurality of queries according to some embodiments of the present disclosure.

It should be noted that the query processing according to embodiments of this disclosure could be implemented by a database system, for example, the computer system 12 shown in FIG. 1.

At block 510, the database system stores a plurality of record identification (ID) numbers in a pool in a numerical order based on a plurality of queries and an execution plan for the plurality of queries. Each of the plurality of record ID numbers identifies a data record in a database.

In some embodiments, the database system may be configured to manage the database which may be included in or communicated to the database system. The database may store a large amount of data records in a table structure on a disk, such as, a removable, non-volatile magnetic disk (e.g., a "floppy disk"), a removable, non-volatile optical disk such as a CD-ROM, DVD-ROM, or other optical media. Each data record may be associated with a customer profile (in some cases, a user profile, a project profile, or the like), and stored in a row of the table structure. Moreover, each row may have a plurality of columns to store a set of features of the data record.

An index may be stored in the database for facilitating the process of data retrieval. Each row of the index stores a record ID number for identifying a corresponding data record in the database. Specifically, the record ID number may correspond to a physical storage location of the data record on the disk. For example, a different value between two record ID numbers indicates a distance between the corresponding two data records on the disk.

In some embodiments, the database system may receive a plurality of queries, such as SQL queries, sequentially or in parallel, from an application. The respective queries may have the same query statement, as described above, while each query may be associated with a variable, such as an identifier related to the customer profile.

Below shows a SQL query relative to the database, as an Example 1:

```
SELECT (
LAST_TRAN_LOCATION,
AVG_AMOUNT_28DAYS,
AVG_AMOUNT_7DAYS,
...
)
FROM CUSTOMER_PROFILE
WHERE CUSTOMER_ID=101
```

As Example 1 shows, the query may be configured to retrieve, from the customer profile with the customer ID 101 (i.e., an identifier 101), a historical transaction data record, comprising last transaction location (LAST_TRAN_LOCATION), average transaction amount for 28 days (AVG_AMOUNT_28DAYS), average transaction amount for 7 days (AVG_AMOUNT_7DAYS), and the like.

In some embodiments, the database system may compile the queries, which can be parsed and normalized through compiling, to determine the execution plan for the plurality of queries. The execution plan may indicate how to perform/execute the respective queries to access the corresponding data records. Furthermore, the database system may only compile one of the queries to determine the execution plan, which may be stored in the cache of the database, such that the database system may then access to the cache to determine the execution plan for other queries, as they have the same query statement.

In some embodiments, the database system may perform the execution plan for each quarry to access the index to retrieve the record ID numbers (for example, based on the respective variables/identifiers associated with the respective queries), and store the record ID numbers in the pool, rather than continuing to perform the execution plan to retrieve the data records. The pool can also be referred to as a record ID number pool, which may also be stored in the database. In some embodiments, the database system may sort the record ID numbers in the pool, such that the record ID numbers may be stored in the pool in a numerical order.

Moreover, the database system may predefine a time period for collecting the record ID numbers. During the predefined time period, the above processes of the query receiving, determination of the execution plan and storage of the record ID number may be performed in succession.

In an embodiment, the predefined time period may be determined based on a first time threshold. As an example, the predefined time period may be based on a maximum latency of the database system, such as 10 ms, or any other appropriate time limits. As another example, the database system may determine a first duration since a first query of the plurality of queries is received. Then, the database system may compare the duration and the first time threshold to determine whether the predefined time period has expired.

In another embodiment, the predefined time period may also be determined based on a usage threshold of the pool. For example, the database system may preset a pool size of the pool and determine how much of the pool size has been used. For example, the predefined time period expires when M % of the pool size is full. In a further embodiment, the pool size of the pool may be determined from an execution history of executing the plurality of queries and a hardware architecture of the database and/or the database system.

Then, at block 520, the database system performs the execution plan for the plurality of queries to batch a plurality of data records corresponding to the plurality of record ID numbers in the database based on a distribution of the plurality of record ID numbers in the pool.

In some embodiments, the database system may calculate a density for each of the plurality of record ID numbers in the pool. Thus, the distribution of the plurality of record ID numbers in the pool may be identified based on the densities of the record ID numbers. Specifically, the density of the record ID number may indicate how close the record ID number and other record ID numbers are, which may then indicate how close the storage location of the corresponding data record and the storage locations of other data records are, for example, on the disk.

In some embodiments, the density may be calculated based on distances between the record ID number and the respective other record ID numbers. For example, the density may be inversely proportional to a sum of the respective distances. Thus, more record ID numbers are distributed near a location where the record ID number having a higher density than a location where the record ID number have a lower density.

In a further embodiment, the database system may set a timer to determine a second duration for which each record ID number is stored in the pool. Thus, the density for each of the plurality of record ID number may be assigned with a weight associated with the second duration.

For example, the weight may be proportional to the second duration. Following, the record ID number with the longer second duration may have a higher density than the record ID number with the shorter second duration, if they have the same distances to other record ID numbers. Then, the database system may retrieve a first record ID number having the highest density and at least one second record ID number adjacent to the first record ID number from the pool. Otherwise, if more than two record ID numbers have the same highest density, the database system may choose one of them as the first record ID number based on any appropriate manner, for example a first one of the record ID numbers.

In some embodiments, a number of the at least one second record ID number can be determined based on a size of the batching. For example, the batching size may be determined from an execution history of executing the plurality queries, based on a data width of the data record, a hardware architecture of the database, or the like. After the record ID numbers are retrieved, the database system may perform the execution plan for the corresponding queries to access the data records corresponding to the retrieved record ID numbers. For example, the first record ID number and the at least one second record ID number. Further, the database system may remove the retrieved record ID numbers from the pool. Therefore, the first batch of the data records can be accessed.

Moreover, the database system may repeat the above steps of density calculation, record ID number retrieval, execution plan performing, and record ID number removal until the pool is empty. The empty pool indicates that all of the data records corresponding to the record ID numbers collected in the pool are accessed.

In some embodiments, the database system may further determine whether the second duration for which the record ID number stored in the pool is longer than a second time threshold. If the second duration associated with a third record ID number is longer than the second time threshold, it implies that the query corresponding to the third record ID number have not been received for a long time. Thus, the database system should retrieve the data records corresponding to the third record ID number soon. Further, the database system may retrieve at least one adjacent record ID number, such as one fourth record ID number, to the third ID number in the index. Thus, the database system may perform the execution plan to access the data records corresponding to the retrieved record ID numbers, such as, the third record ID number and the at least one fourth record ID number. On the other hand, after the third record ID number and the adjacent record(s) are retrieved, they may be removed from the pool.

The method according to some embodiments of the present disclosure may also be utilized for Single Instruction/Multiple Data (SIMD) operations. The SIMD operations may score multiple records at a time, which is more efficient than scoring a record multiple times.

In some embodiments, the database system may send the batched (or accessed) data records back to the application from which the queries are sent. The application may receive the data records, and then send the data records along with newly input data, such as, current transaction data, to an inference engine. For example, the inference engine may be a neural network model for scoring purposes. The inference engine may perform model inferencing based on the input data and the data records.

Figure 6:
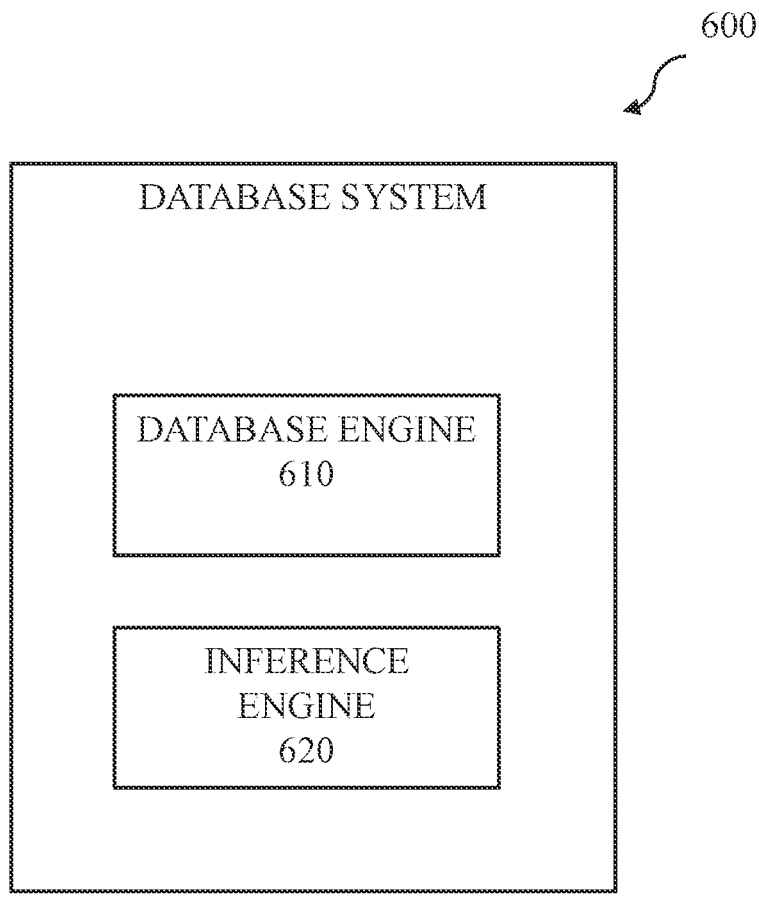
FIG. 6 depicts a block diagram of the database system according to some embodiments of the present disclosure.

Furthermore, embodiments of the present disclosure provide a database system integrated with an inferencing function. FIG. 6 shows a block diagram of the database system 600 for processing inference queries according to embodiments of the present disclosure. It should be noted that the database system 600 could be implemented by the computer system 12 shown in FIG. 1.

As shown in FIG. 6, the database system 600 may comprise a database engine 610 and an inference engine 620, which can be implemented by the processing unit 16. In some embodiments, the database engine 610 may be configured to perform data batching based on a plurality of inference queries. The inference engine 620 may be configured to perform model inferencing, such as, a transaction prediction based on the inference queries and the batched data. Further, the inference engine 520 may be implemented by any scoring model, such as, a neural network model.

With the model inferencing function integrated, the database system 600 may further reduce the number of I/O operations, as there is no need to transfer the data records from the database to the application and then from the application to the external inference engine. Therefore, the efficiency of model inferencing can be further improved.

Figure 7:
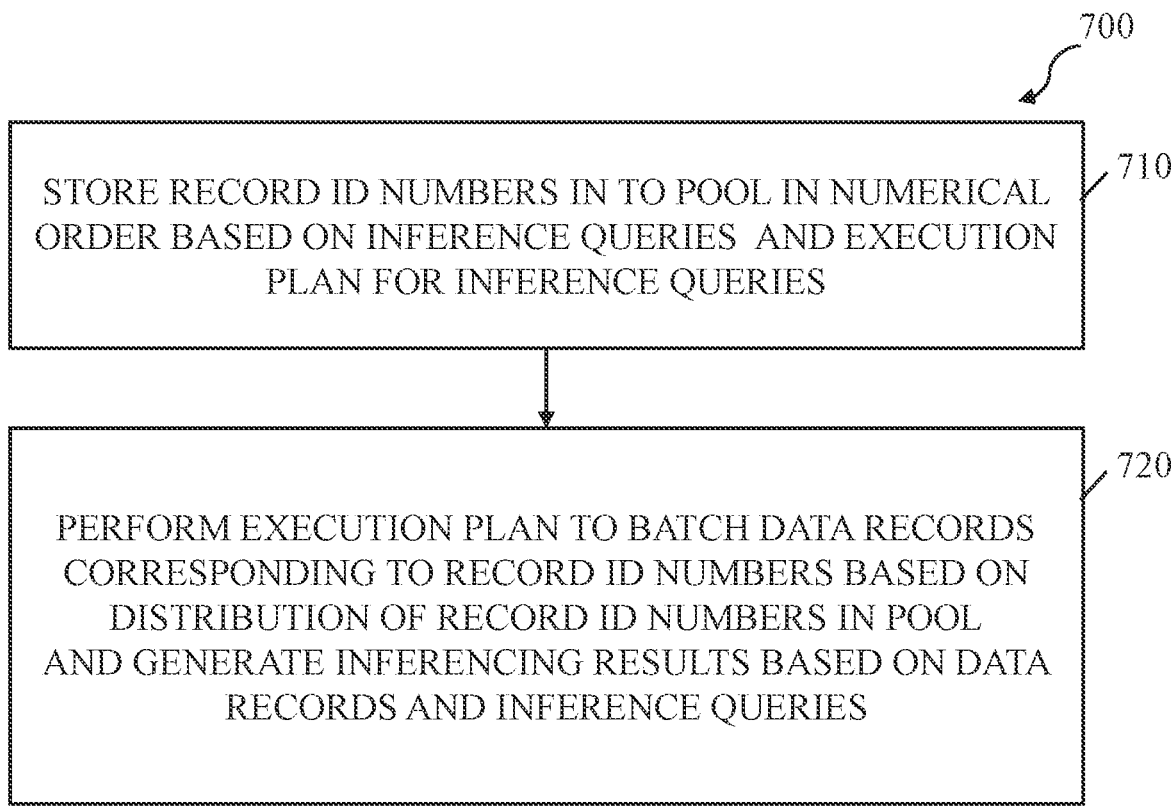
FIG. 7 depicts a schematic flowchart of a method for processing a plurality of inference queries according to some embodiments of the present disclosure.

Embodiments of the present disclosure provide a method for processing a plurality of inference queries. FIG. 7 shows a schematic flowchart of a method 700 for processing a plurality of inference queries according to embodiments of the present disclosure.

It can be noted that the processing of inference query processing according to embodiments of this disclosure could be implemented by a database system, such as, the database system 600.

At block 710, the database system stores a plurality of record identification (ID) numbers in a pool in a numerical order, based on a plurality of inference queries and an execution plan for the plurality of inference queries. Each of the plurality of record ID numbers identifies a data record in a database, managed by the database system. The process of block 710 is similar to the process of block 510, and thus not all contents are re-introduced for sake of brevity. In some embodiments, the process of block 710 can be implemented by the database engine 610.

In some embodiments, the respective inference queries may have the same query statement, and each inference query may be associated with a variable or identifier, such as, a customer ID for a customer profile. Thus, the respective inference queries may share the same execution plan. Similar with the query described above, the inference query may be configured to access a data record associated with a user profile (in other embodiments a customer profile, a project profile, or the like), in the database. For example, the data record may comprise the historical transaction data record, such as, last transaction location, average transaction amount for last 28 days, average transaction amount for 7 days, or the like. Additionally, the inference query may also comprise input data, for example, current transaction inputs, such as a transaction time, a transaction amount, a transaction location, or the like. Accordingly, the inference query may make predict with the input data and the accessed data record.

Below shows a SQL inference query relative to the database system, as an Example 2. The inference query may comprise the input data, such as, current transaction time (trans_time), current transaction amount (trans_amount), or the like. Moreover, the inference query may also be configured to retrieve, from the customer profile with the customer ID 121 (i.e., an identifier 121), the historical transaction data record. PREDICT is the function provided by the database to make predictions with the input data and the customer profile using the inferencing engine embedded in the database.

| SELECT PREDICT( |
| --- |
| trans_time, --transaction input |
| trans_amount, |
| ... |
| LAST_TRAN_LOCATION, |
| AVG_AMOUNT_28DAYS, |
| AVG_AMOUNT_7DAYS, |
| .. |
| ) |
| FROM CUSTOMER_PROFILE |
| WHERE CUSTOMER_ID=121 |

Therefore, both data retrieval and model inferencing can be pushed down to the database system. Thus, the database system may determine the execution plan for data retrieval and model inferencing. The data retrieval and the model inferencing can be optimized in one execution plan for enhanced performance.

At block 720, the database system performs the execution plan to batch a plurality of data records corresponding to the plurality of record ID numbers in the database based on a distribution of the plurality of record ID numbers in the pool. This process is similar to the process of block 520, and thus not all contents are re-introduced for sake of brevity. Additionally, the database system performs the execution plan to further generate inferencing results based on the inference queries and the batched data records, at block 720.

In some embodiments, the process of block 720 can be implemented by a combination of the database engine 610 and the inference engine 620. For the Example 2, the database engine 610 may retrieve the historical transaction data record from the customer profile with the customer ID 101, based on the execution plan. The inference engine 620 may perform the model inferencing based on the transaction input data from the inference query and the retrieved historical transaction data record.

Therefore, an inferencing result can be output from the database system 600 (the inference engine 620). The inferencing result may be utilized for various purposes, such as, to provide new and useful information for presentation to a user, like the identity of the user that entered the inference query. The information may involve a determination of whether a current transaction is a fraudulent transaction, whether the user would be interested in a promote sale, whether the user tends to file a complaint related to a transaction, or the like.

Figure 8:
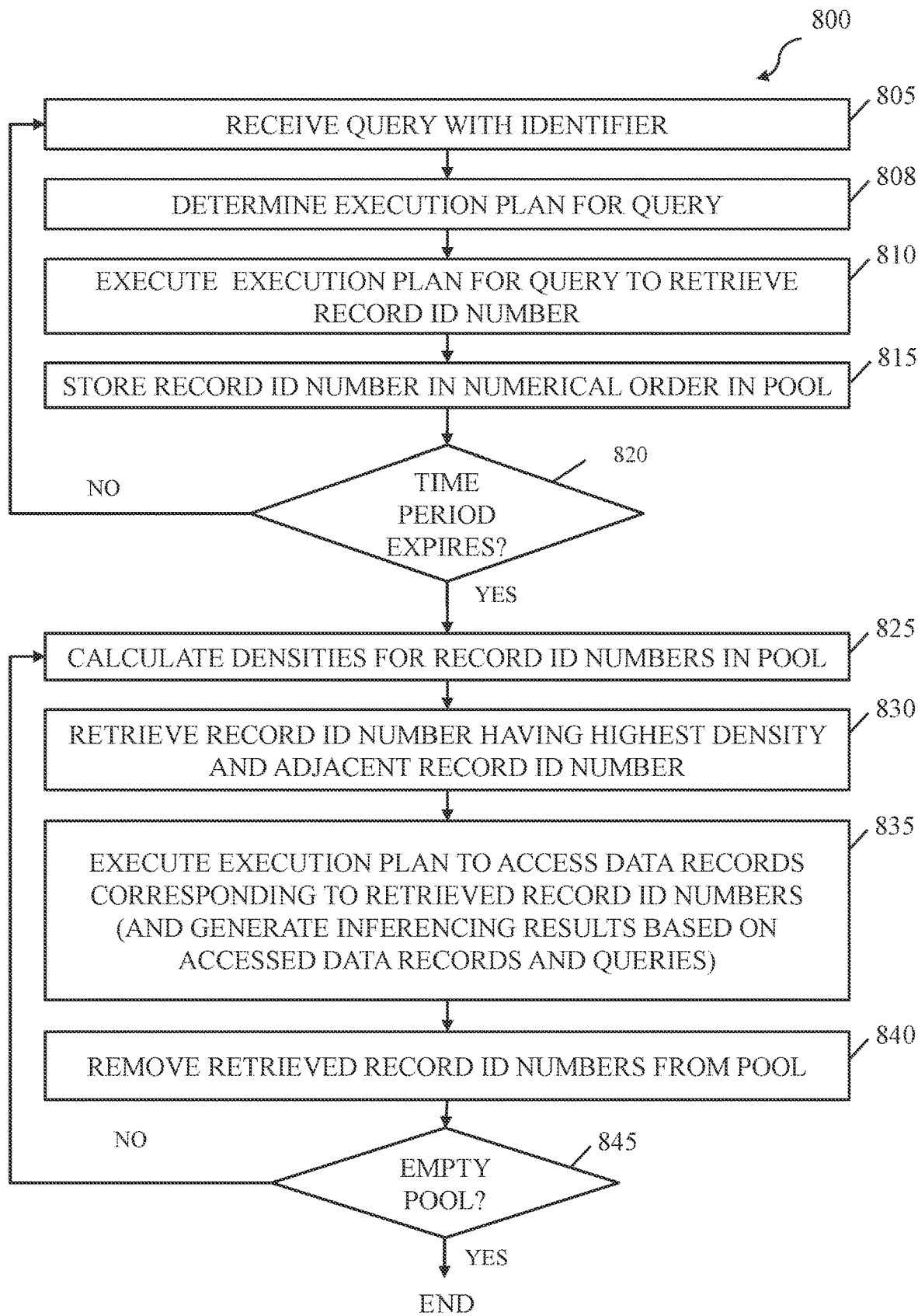
FIG. 8 depicts an illustrative flowchart of a process of query processing according to some embodiments of the present disclosure.
Figure 9:
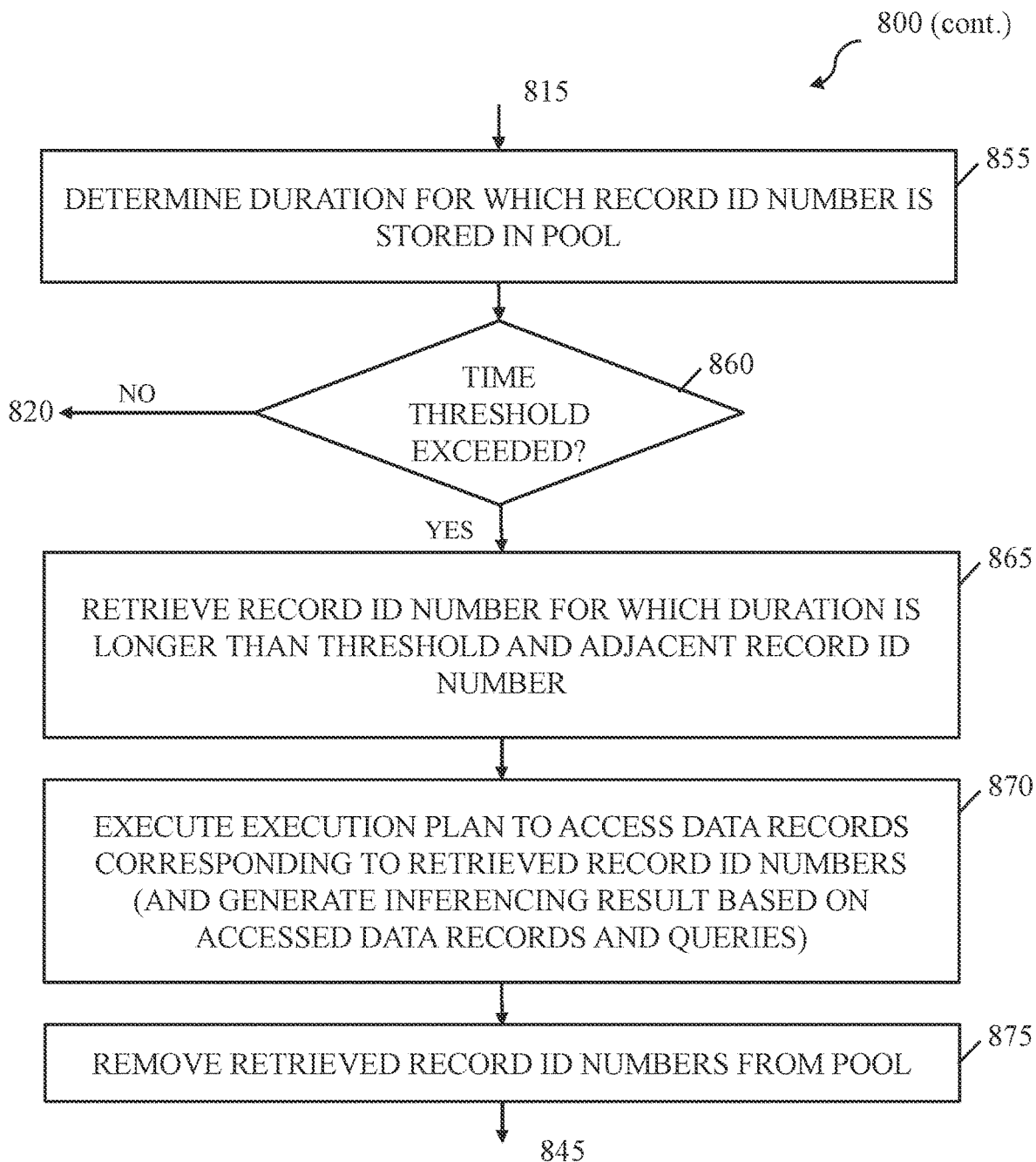
FIG. 9 depicts an illustrative flowchart of a supplement process of query processing in FIG. 8.

FIG. 8 depicts an illustrative flowchart of a process of query processing according to some embodiments of the present disclosure. FIG. 9 depicts an illustrative flowchart of a supplement process of query processing in FIG. 8. It should be noted that the processing of query processing in FIG. 8 and FIG. 9 could be implemented by a database system, for example, the computer system 12 shown in FIG. 1, such as, the database system 600 in FIG. 6.

Figure 10:
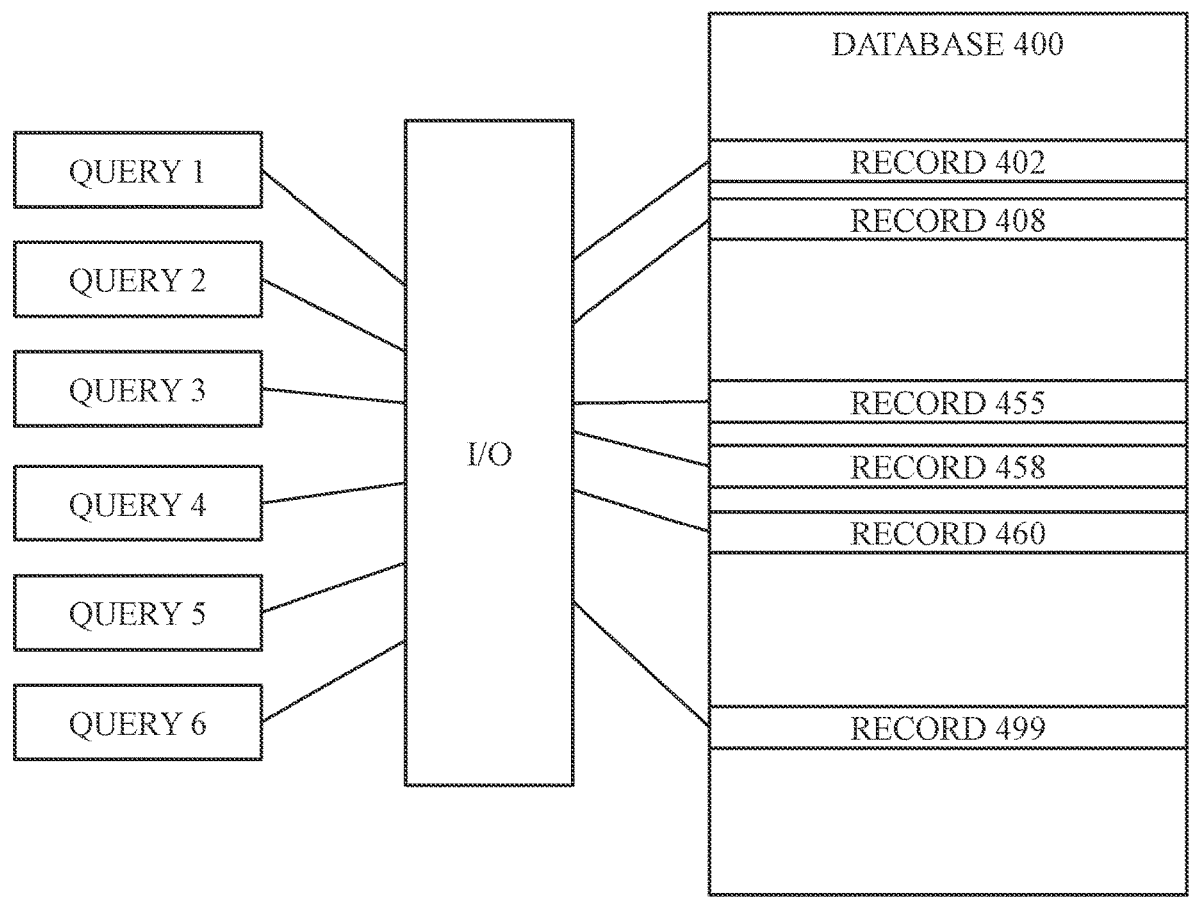
FIG. 10 depicts another exemplary process of querying relative to the database according to some embodiments of the present disclosure.

The processes, designated as 800, of FIG. 8 and continuing onto FIG. 9, will be described in combination with FIG. 10, which shows another exemplary process of querying relative to the database 400 according to embodiments of the present disclosure.

In some embodiments, at block 805, the database system may receive the query QUERY 1. At block 808, the database system may determine an execution plan for the query QUERY 1. Moreover, the database system may store the execution plan in a memory of the database system, or the database 400. Thus, the execution plan may be performed by the database system to retrieve the record ID 458 from the index at block 810, for example, based on the variable of the query QUERY 1. At block 815, the database system may store the record ID number 458 in a pool, rather than continuing to perform the execution plan to retrieve the data record.

Accordingly, the database system performs a next round of the blocks 805, 808, 810, and 815 for the next query with the same query statement. In this case, the database system may determine the execution plan based on the stored execution plan. For example, the database may receive the query QUERY 2 at block 805, reuse the stored QUERY 1's execution plan for the query QUERY 2, perform the execution plan to retrieve the record ID number 408 from the index, and store the record ID number 408 in the pool. Repeated processes can be omitted for brevity. Accordingly, the respective record ID numbers (402, 408, 455, 458, 460, 499) can be stored in the pool in a numeral order.

The processes of blocks 805, 808, 810, 815 can be performed to implement the process of block 510. Moreover, if the respective queries are inference queries, the processes of blocks 805, 808, 810, 815 can also be performed to implement the process of block 710. In this case, the execution plan may further be related to model inferencing.

Further, at block 825, the database system may calculate densities for each of the record ID numbers (402, 408, 455, 458, 460, 499) in the pool. Taking the density of the record ID number 458 as an example, which can be calculated based on the below equation:

$$\text{Density of the record } 458 = w1*(1/(458-402)) + w2*(1/(458-408)) + w3*(1/(458-455)) + w4*(1/(460-458)) + w5*(1/(499-458))$$

In the equation, the weights (w1, w2, w3, w4, w5) are calculated based on the respective durations of the record ID numbers stored in the pool. For example, w1 is proportional to the duration for which record 402 is stored in the pool, w2 is proportional to the duration for which record 408 is stored in the pool, w3 is proportional to the duration for which record 455 is stored in the pool, w4 is proportional to the duration for which record 460 is stored in the pool, and w5 is proportional to the duration for which record 499 is stored in the pool.

Back to FIG. 8, at block 830, the database system may retrieve the record ID numbers comprising the record ID number having the highest density. In some embodiments, a number of the retrieved record ID numbers can be determined based on a batching size, such as 8 bytes, which may be determined from an execution history of the queries based on a data width of the data record and a hardware architecture of the database system. For example, in FIG. 10, if the record ID number 458 is determined to have the highest density, the database system may retrieve the record ID number 458 and its adjacent record ID numbers, such as, the record ID numbers 455 and 460.

At block 835, the database system may perform the execution plan to access the data records corresponding to the record ID numbers 455, 458 and 460. Moreover, the retrieved record ID numbers 455, 458 and 460 may be removed from the pool at block 840.

Moreover, the database system may determine whether the pool is empty at block 845. If the pool is not empty, the process may continue back to block 825. In this case, the database system may recalculate the density for the remaining record ID numbers, like 402, 408, 499, and repeat the above processes until the pool is empty. The empty pool may indicate that the process ends.

In this embodiment, the data records in the database may be accessed for only a couple of batches, thereby implementing an optimized I/O layer. Thus, it is more efficient than accessing each data record from the database sequentially as described above with respect to the FIG. 4.

Therefore, the processes of blocks 825, 830, 835, and 840 can be performed to implement the process of block 520.

Additionally, if the queries are the inference queries, the database system may perform the execution plan to further generate inferencing results based on the inference queries and the access data records at block 835. Thus, the processes of blocks 825, 830, 835, and 840 can also be performed to implement the process of block 720.

Additionally, from FIG. 9, after the record ID number is stored in the pool in block 815, the database system may also set a timer to determine a duration for which the record ID number is stored in the pool at block 855. At block 860, the database system may determine if the duration exceeds a second time threshold. If the time threshold is not exceeded, the process may be continued at block 820. Alternatively, for example, if the duration associated with the record ID number 408 exceeds the second time threshold, the database system may retrieve the corresponding record ID number (for example, 408) and adjacent record ID numbers (for example, 402) from the pool at block 865.

Then, the database system may perform the execution plan for the corresponding queries to access the data records corresponding to the retrieved record ID numbers at 870. If the queries are inferencing queries, an inferencing result may be generated based on the execution plan and the data records at block 870. The database system may remove the retrieved record ID numbers from the pool at block 875, and the process may continue at block 845. Therefore, the processes of blocks 855, 860, 865, 870 and 875 can be performed to implement the process of block 520 or 720.

Efficiency of the disk I/O operations may be improved while query processing according to the methods of embodiments of the present disclosure. With a large amount of queries received by the database system in a short time period, execution costs can be saved by the enhanced efficiency of the disk I/O operations. Moreover, the data retrieval and the model inferencing can be pushed down to the database system, which can be optimized in one execution plan for enhanced performance.

It should be noted that, the sequence of the blocks described in the embodiments are merely for illustrative purposes. Any other appropriate sequences (including addition, deletion, and/or modification of at least one block) can also be implemented to realize the corresponding embodiments.

Additionally, in some embodiments of the present disclosure, a system for processing a plurality of queries may be provided. The system may comprise one or more processors, a memory coupled to at least one of the one or more processors, and a set of computer program instructions stored in the memory. The set of computer program instructions may be executed by at least one of one or more processors to perform the above method.

In some other embodiments of the present disclosure, a computer program product for processing a plurality of queries may be provided. The computer program product may comprise a computer readable storage medium having program instructions embodied therewith. The program instructions executable by one or more processors causes the processor to perform the above method.

The present invention may be a system, a method, or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a plurality of queries from a database, comprising:

storing, by one or more processing units, based on a plurality of queries and an execution plan for the plurality of queries, a plurality of record identification (ID) numbers in a pool in a numerical order, wherein each of the plurality of record ID numbers identifies a data record in the database, further comprises:

during a predefined time period:

receiving, by one or more processing units, a query for the database;

determining, by one or more processing units, for the query, an execution plan comprising a record ID number;

executing, by one or more processing units, the execution plan for the query to retrieve the record ID number from an index; and storing, by one or more processing units, the record ID number in the pool;

performing, by the one or more processing units, the execution plan to batch a plurality of data records corresponding to the plurality of record ID numbers in the database based on a distribution of the plurality of record ID numbers in the pool; and performing a model inferencing, by an inference engine that is executed by the one or more processing units, based on the plurality of queries and batched data, wherein the inference engine is implemented by a neural network model.

2. The method of claim 1, wherein:

performing the execution plan to batch the plurality of data records corresponding to the plurality of record ID numbers in the database based on the distribution of the plurality of record ID numbers in the pool comprises:

calculating, by one or more processing units, a density for each of the plurality of record ID numbers in the pool;

retrieving, by one or more processing units, a first record ID number having the highest density and at least one second record ID number adjacent to the first record ID number from the pool;

executing, by one or more processing units, the execution plan to access the data records corresponding to the first record ID number and the at least one second record ID number from the database;

removing, by one or more processing units, the first record ID number and the at least one second record ID number from the pool; and repeating, by one or more processing units, the steps of calculating, retrieving, executing and removing until the pool is empty.

3. The method of claim 2, wherein:

the plurality of queries are inference queries, and the execution plan to access the data records corresponding to the first record ID number and the at least one second record ID number comprises:

executing, by one or more processing units, the execution plan to access the data records corresponding to the first record ID number and the at least one second record ID number and generate inference results based on the inference queries and the accessed data records.

4. The method of claim 2, wherein the density is calculated based on distances between the record ID number and the respective other record ID numbers.

5. The method of claim 2, wherein a number of the at least one second record ID number is determined based on a batching size of the batching, and the batching size is determined from the execution history of processing the queries, based on a data width of the data record in the database and a hardware architecture of the database.

6. The method of claim 1, wherein performing the model inferencing comprises of, provide new and useful information for a presentation to a user and providing information relating to a current transaction to the user to determine whether the current transaction is a fraudulent transaction.

7. The method of claim 1, wherein the predefined time period is determined based on a first time threshold or a usage threshold of the pool.

8. The method of claim 2, further comprising:

determining, by one or more processing units, durations for which the respective record ID numbers are stored in the pool.

9. The method of claim 8, wherein the density for each of the plurality of record ID numbers is calculated based on the durations.

10. The method of claim 1, wherein performing the execution plan to batch the plurality of data records corresponding to the plurality of record ID numbers in the database based on the distribution of the plurality of record ID numbers in the pool comprises:

determining, by one or more processing units, durations for which the respective record ID numbers are stored in the pool;

retrieving, by one or more processing units, a third record ID number, for which the duration is longer than a second time threshold, and at least one fourth record ID number adjacent to the third record ID number from the pool;

executing, by one or more processing units, the execution plan to access the data records corresponding to the third record ID number and the at least one fourth record ID number from the database; and removing, by one or more processing units, the third record ID number and the at least one fourth record ID number from the pool.

11. The method of claim 10, wherein the plurality of queries are inference queries, and executing the execution plan to access the data records corresponding to the third record ID number and the at least one fourth record ID number comprises:

executing, by one or more processing units, the execution plan to access the data records corresponding to the third record ID number and the at least one fourth record ID number and generate inference results based on the inference queries and the accessed data records.

12. The method of claim 1, wherein a pool size of the pool is determined from the execution history of processing the queries, based on a data width of the data record in the database and a hardware architecture of the database.

13. A system for processing a plurality of queries from a database, comprising:

a memory; and a processor communicatively coupled to the memory, wherein the processor is configured to perform a method comprising:

storing, based on a plurality of queries and an execution plan for the plurality of queries, a plurality of record identification (ID) numbers into a pool in a numerical order, wherein each of the plurality of record ID numbers identifies a data record in the database, further comprises:

during a predefined time period;

receiving, by one or more processing units, a query for the database;

determining, by one or more processing units, for the query, an execution plan comprising a record ID number;

executing, by one or more processing units, the execution plan for the query to retrieve the record ID number from an index; and storing, by one or more processing units, the record ID number in the pool;

performing the execution plan to batch a plurality of data records corresponding to the plurality of record ID numbers in the database based on a distribution of the plurality of record ID numbers in the pool; and performing, a model inferencing, by an inference engine based on the plurality of queries and batched data, wherein the inferencing engine is implemented by a neural network model.

14. The system of claim 13, wherein:
performing the execution plan to batch the plurality of data records corresponding to the plurality of record ID numbers in the database based on the distribution of the plurality of record ID numbers in the pool comprises:
calculating a density for each of the plurality of record ID numbers in the pool;
retrieving a first record ID number having the highest density and at least one second record ID number adjacent to the first record ID number from the pool;
executing the execution plan to access the data records corresponding to the first record ID number and the at least one second record ID number from the database;
removing the first record ID number and the at least one second record ID number from the pool; and
repeating the steps of calculating, retrieving, executing and removing until the pool is empty.

15. The system of claim 14, wherein:
the plurality of queries are inference queries, and wherein executing the execution plan to access the data records corresponding to the first record ID number and the at least one second record ID number comprises:
executing the execution plan to access the data records corresponding to the first record ID number and the at least one second record ID number and generate inference results based on the inference queries and the accessed data records.

16. The system of claim 14, wherein the density is calculated based on distances between the record ID number and the respective other record ID numbers.

17. The system of claim 13, wherein performing the model inferencing comprises of, provide new and useful information for a presentation to a user and providing information relating to a current transaction to the user to determine whether the current transaction is a fraudulent transaction.

18. The system of claim 13, wherein the plurality of queries are inference queries, and wherein performing the execution plan to batch the plurality of data records corresponding to the plurality of record ID numbers in the database based on the distribution of the plurality of record ID numbers in the pool comprises:
determining durations for which the respective record ID numbers are stored in the pool;
retrieving a third record ID number, for which the duration is longer than a second time threshold, and at least one fourth record ID number adjacent to the third record ID number from the pool;
executing the execution plan to access the data records corresponding to the third record ID number and the at least one fourth record ID number from the database and generate inference results based on the inference queries and the accessed data records; and
removing the third record ID number and the at least one fourth record ID number from the pool.

19. A computer program product for processing a plurality of queries from a database, the computer program product comprising a computer readable storage medium having program instructions embodied therewith, the program instructions executable by a processor to cause a device to perform a method, comprising:
storing, based on a plurality of queries and an execution plan for the plurality of queries: a plurality of record identification (ID) numbers into a pool in a numerical order, wherein each of the plurality of record ID numbers identifies a data record in the database, further comprises:
during a predefined time period;
receiving, by one or more processing units, a query for the database;
determining, by one or more processing units, for the query, an execution plan comprising a record ID number;
executing, by one or more processing units, the execution plan for the query to retrieve the record ID number from an index; and
storing, by one or more processing units, the record ID number in the pool;
performing the execution plan to batch a plurality of data records corresponding to the plurality of record ID numbers in the database based on a distribution of the plurality of record ID numbers in the pool; and
performing, a model inferencing, by an inference engine based on the plurality of queries and batched data, wherein model inferencing is implemented by using a neural network model.

20. The computer program product of claim 19, wherein the plurality of queries are inference queries, and wherein performing the execution plan to batch the plurality of data records corresponding to the plurality of record ID numbers in the database based on the distribution of the plurality of record ID numbers in the pool comprises:
calculating a density for each of the plurality of record ID numbers in the pool;
retrieving a first record ID number having the highest density and at least one second record ID number adjacent to the first record ID number from the pool;
executing the execution plans to access the data records corresponding to the first record ID number and the at least one second record ID number from the database and generate inference results based on the inference queries and the accessed data records;
removing the first record ID number and the at least one second record ID number from the pool; and
repeating the steps of calculating, retrieving, executing and removing until the pool is empty.

* * * * *